United States Patent
Di et al.

(10) Patent No.: US 11,748,975 B2
(45) Date of Patent: Sep. 5, 2023

(54) METHOD AND DEVICE FOR OPTIMIZING OBJECT-CLASS MODEL BASED ON NEURAL NETWORK

(71) Applicant: GOERTEK INC., Shandong (CN)

(72) Inventors: Shunran Di, Shandong (CN); Yifan Zhang, Shandong (CN); Jie Liu, Shandong (CN); Jifeng Tian, Shandong (CN)

(73) Assignee: GOERTEK INC., Shandong (CN)

( * ) Notice: Subject to any disclaimer, the term of this patent is extended or adjusted under 35 U.S.C. 154(b) by 270 days.

(21) Appl. No.: 17/309,308

(22) PCT Filed: Oct. 30, 2020

(86) PCT No.: PCT/CN2020/125346
§ 371 (c)(1),
(2) Date: May 18, 2021

(87) PCT Pub. No.: WO2021/135607
PCT Pub. Date: Jul. 8, 2021

(65) Prior Publication Data
US 2022/0309765 A1  Sep. 29, 2022

(30) Foreign Application Priority Data
Dec. 31, 2019  (CN) .......................... 201911420340.9

(51) Int. Cl.
*G06V 10/764* (2022.01)
*G06V 10/771* (2022.01)
(Continued)

(52) U.S. Cl.
CPC ............. *G06V 10/764* (2022.01); *G06N 3/08* (2013.01); *G06V 10/771* (2022.01); *G06V 10/776* (2022.01); *G06V 10/82* (2022.01)

(58) Field of Classification Search
CPC .. G06V 10/764; G06V 10/771; G06V 10/776; G06V 10/82; G06N 3/08;
(Continued)

(56) References Cited

U.S. PATENT DOCUMENTS

2017/0220904 A1   8/2017  Bai
2017/0243114 A1   8/2017  Kurata
(Continued)

FOREIGN PATENT DOCUMENTS

CN   108304936 A   7/2018
CN   109614907 A   4/2019
(Continued)

OTHER PUBLICATIONS

Shu Zhong, Implementation of Image Sample Label Assignment correction algorithm Based on Depth Learning, Digital Printing, Oct. 10, 2019, Tol. 202, No. 4/5, Jingmen CN.

*Primary Examiner* — Juan A Torres
(74) *Attorney, Agent, or Firm* — LKGlobal | Lorenz & Kopf, LLP (57) ABSTRACT

The present disclosure discloses a method and device for optimizing an object-class model based on a neural network. The method includes: establishing the object-class model based on the neural network, training the object-class model, and realizing classification of target images by using the object-class model that has been trained; and when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to
(Continued)

obtain an object-class model that is capable of correctly classifying the new target image.

19 Claims, 2 Drawing Sheets

(51) Int. Cl.
*G06V 10/82* (2022.01)
*G06V 10/776* (2022.01)
*G06N 3/08* (2023.01)

(58) Field of Classification Search
CPC ........ G06N 3/09; G06N 3/0464; G06N 3/084; G06N 3/045; G06F 18/241
USPC ....................................................... 382/155
See application file for complete search history.

(56) References Cited

U.S. PATENT DOCUMENTS

| | | | |
|---|---|---|---|
| 2018/0232601 A1* | 8/2018 | Feng | G06T 7/0004 |
| 2018/0268298 A1* | 9/2018 | Johansen | G06V 10/764 |
| 2019/0362490 A1 | 11/2019 | Wen et al. | |
| 2019/0377949 A1 | 12/2019 | Chen | |
| 2019/0385059 A1 | 12/2019 | Huang et al. | |
| 2020/0285938 A1* | 9/2020 | Kim | G06T 7/136 |

FOREIGN PATENT DOCUMENTS

| | | |
|---|---|---|
| CN | 110210560 A | 9/2019 |
| CN | 110211123 A | 9/2019 |
| CN | 110321964 A | 10/2019 |
| CN | 110472681 A | 11/2019 |
| CN | 111178446 A | 5/2020 |
| JP | 2007198968 A | 8/2007 |

\* cited by examiner

METHOD AND DEVICE FOR OPTIMIZING OBJECT-CLASS MODEL BASED ON NEURAL NETWORK

CROSS-REFERENCE TO RELATED APPLICATION

This Application is a U.S. National-Stage entry under 35 U.S.C. § 371 based on International Application No. PCT/CN2020/125346, filed Oct. 30, 2020 which was published under PCT Article 21(2) and which claims priority to Chinese Application No. 201911420340.9, filed Dec. 31, 2019, which are all hereby incorporated herein in their entirety by reference.

TECHNICAL FIELD

This Application pertains to the technical field of machine vision, and particularly relates to a method and device for optimizing an object-class model based on a neural network, an electronic device and a readable storage medium.

BACKGROUND

With the development of deep learning, artificial intelligence (AI) is increasingly extensively used in the field of intelligent manufacturing. In many practical engineering deployments, artificial intelligence has played a significant role in quality controlling, detection of defect classes and so on.

However, with the development of the artificial intelligence based on deep learning, the artificial intelligence models are becoming increasingly larger, and the training is becoming increasingly more difficult. Usually, one run of model training on a single graphics processing unit (GPU) costs three hours or longer. However, in the application of defect detection in practical production, such a speed of model updating with the unit of hour is difficult to accommodate certain sudden demands by the production line. For example, the data distributions of the products of the current batch and of those of the previous batches are different, much missing inspection is generated, but the model cannot accommodate such a difference quickly. Such a change in the demand requires the model to quickly accommodate within a very short time, but the conventional model training requires at least 1-2 hours, which is far from satisfying the demand. Therefore, an optimized solution for realizing the quick training of a model is needed. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a method and device for optimizing an object-class model based on a neural network, an electronic device and a readable storage medium that overcome the above problems or at least partially solve the above problems.

According to an aspect of the embodiments of the present disclosure, there is provided a method for optimizing an object-class model based on a neural network, wherein the method comprises:

establishing the object-class model based on the neural network, training the object-class model, and realizing classification of target images by using the object-class model that has been trained; and when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

According to another aspect of the embodiments of the present disclosure, there is provided a device for optimizing an object-class model based on a neural network, wherein the device comprises:

a model operating unit, adapted for establishing the object-class model based on the neural network, training the object-class model, and realizing classification of target images by using the object-class model that has been trained; and a model optimizing unit, adapted for, when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

According to yet another aspect of the embodiments of the present disclosure, there is provided an electronic device, comprising: a processor; and a memory adapted for storing a computer program, wherein when the computer program is executed, the computer program causes the processor to execute the above-described method.

According to still another aspect of the embodiments of the present disclosure, there is provided a computer readable storage medium, wherein the computer readable storage medium stores one or more programs, and when the one or more programs are executed by a processor, the one or more programs realize the above-described method.

It can be known from the above that the technical solutions according to the present disclosure can obtain the following technical effects:

The technical solutions can maintain the present performance of classification detection of the present object-class models, and at the same time correctly classify some cases or scenes that are newly generated and images that can be easily undetected into the corresponding classes.

The technical solutions, in the process of adjusting and optimizing the model, can reserve most of the parameters, and enable the model to accommodate new image data by merely modifying a small quantity of the parameters.

The method for training and optimizing a model can enable the model to accommodate new scenes while ensuring the performance of the original model, and has a high speed, whereby the model training can be completed within approximately 20 minutes, which, as compared with conventional model training, greatly optimizes the speed of model training.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present disclosure will be described in further detail below by referring to the drawings. Although the drawings illustrate the exemplary embodiments of the present disclosure, it should be understood that the present disclosure can be implemented in various forms, which should not be limited by the embodiments illustrated herein. In contrast, the purpose of providing those embodiments is to more clearly understand the present disclosure, and to completely convey the scope of the present disclosure to a person skilled in the art.

Figure 1:
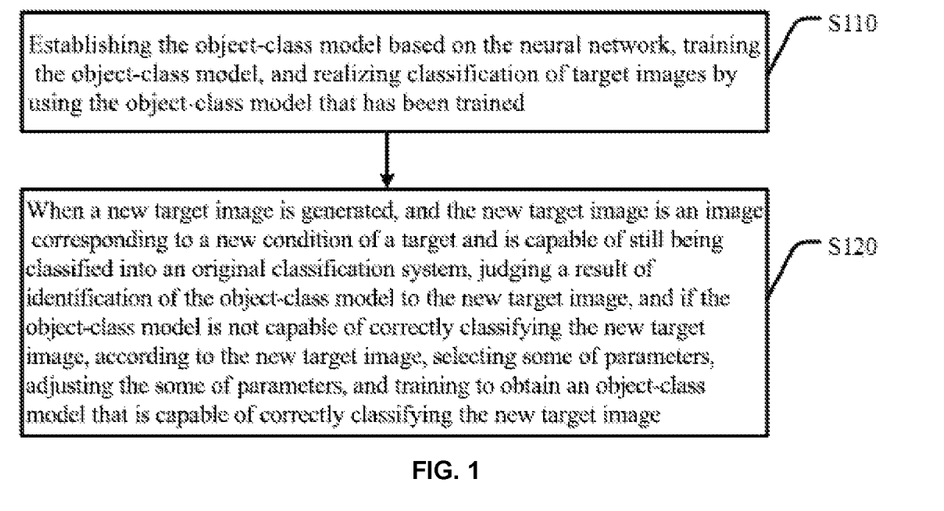
FIG. 1 shows a schematic flow chart of the method for optimizing an object-class model based on a neural network according to an embodiment of the present disclosure.

FIG. 1 shows a schematic flow chart of the method for optimizing an object-class model based on a neural network according to an embodiment of the present disclosure. The method comprises:

Step S110, establishing the object-class model based on the neural network, training the object-class model, and realizing classification of target images by using the object-class model that has been trained.

The present embodiment of the present disclosure discloses a method for optimizing and adjusting an object-class model based on a neural network, which may be used to detect defective products and identify the classes of the defects of the products in a smart manufacturing production line, and may also be used for other object-class detections, for example the detection and class identification of objects such as cars.

The present disclosure mainly realizes the adjusting and optimization of present object-class models. The step S110 describes the process of forming the model, which comprises the procedures of the establishing and training of the object-class model based on the neural network and the realizing of the classification of the target images.

Step S120, when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

According to the object of the present disclosure, the present embodiment designs a solution that can optimize an object-class model. When a target image of a new condition is generated, according to the target image, some of parameters are selected. The some of parameters may be parameters of the model, and may also be parameters that are involved in the pre-processing of the image, and the some of parameters are selected according to the new target image, and can have a great influence on or show an obvious difference in the correct classification or identification of the new target image. By merely adjusting some of parameters the correct classification by the model to the new target image can be realized, and at the same time the other most of the parameters are not required to be changed.

In conclusion, the optimized solution according to the present embodiment can solve the problem that, when in a present production line a verified model is running and some new abnormal problems suddenly emerge, the present model cannot discriminate them. As the production line cannot stop operating, the optimized solution can enable the model to quickly iterate, and accurately discriminate the classes of the abnormal product defects, to satisfy the new demands of the production line. Furthermore, the solution can reserve most of the parameters of the present model, and enable the model to accommodate the data of the new target image by merely modifying a small quantity of the parameters.

In an embodiment, the step of, according to the new target image, selecting the some of parameters, adjusting the some of parameters, and training to obtain the object-class model that is capable of correctly classifying the new target image comprises one or two of the following:

One manner is: selecting a label value for classifying the new target image, and, according to a type of a loss function in the object-class model, adjusting the label value.

Usually, a correct classification is encoded to be 1, and an erroneous classification is encoded to be 0. However, in the quick training according to the present embodiment, it is not suitable to directly use 0 and 1 as the targets for the fitting, because that tends to cause over-fitting of the model. In the present embodiment, as determined by tests, label values having different value intervals are set according to the different types of the loss functions in the object-class model, and the object-class model can accommodate the data of new target images, so that the object-class model can correctly identify and classify the target images that are newly generated.

Another manner is performing error calculation to a data sample of the new target image, acquiring gradient values of parameters in the object-class model, selecting some of parameters according to magnitudes of the gradient values, and updating some of parameters.

Error calculation is one of the cores of deep learning. Error calculation can be implemented particularly by the calculation of the following functions: Loss Function is defined on one single sample, and is used to calculate the error of one single sample; Cost Function is defined on an entire training set, and is the average of all of the sample errors, i.e., the average of loss functions; Object Function is a finally optimized function, and is equal to empirical risk+structural risk; and Risk Function is the expectation of loss functions. In error calculation, over-fitting should be prevented. Over-fitting refers to the excessive fitting of the training set, which results in that in the actual predicting the effect will be very non-ideal. One of the solutions of over-fitting is regularization, which is a rule that prevents over-fitting by reducing the complexity of a complex model.

In the present embodiment, in order to quickly obtain the result of training, the object of error calculation is to obtain the gradient values of the corresponding parameters of the object-class model in the new target images. Particularly, the error calculation may be implemented by using algorithms such as Sobel operator, Laplacian operator and Canny edge detection. Certainly, the error calculation is not limited to those algorithms. After the gradient values have been obtained, some of the parameters that have a larger influence on the correct detection of new target images may be selected, according to the magnitudes of the gradient values, for the adjusting.

In an embodiment, the step of selecting the label value for classifying the new target image, and, according to the type of the loss function in the object-class model, adjusting the label value comprises:

if the loss function in the object-class model is a focal_loss function, setting a label value of a primary class to be a first value in a first numerical-value range and a label value of a secondary class to be 0; and if the loss function is a loss function other than the focal_loss function, setting a label value of a primary class to be a second value in a second numerical-value range, and a label value of a secondary class to be an average value of a difference between 1 and the second value divided by a quantity of labels of the secondary class; wherein both of the first numerical-value range and the second numerical-value range are a subset of (0.5-1).

In a particular situation, the label value of the primary class refers to the label value of a correct class, and the label value of the secondary class refers to the label value of an erroneous class. Assuming that the object-class model aims to classify the inputted data into 5 classes, and the current inputted image is of the first class, a conventional solution will set the target of the model training to be [1,0,0,0,0].

In order to prevent over-fitting, in the present embodiment, if the object-class model uses the focal_loss loss function, the label of the correct primary class may be set to be a numerical value in the range of 0.5-1, preferably 0.6-0.8. At this point, the label value of the secondary class, i.e., the erroneous label, is set to be 0, for example, setting the target to be [0.6,0,0,0,0].

If a loss function other than the focal_loss function is employed, for example a traditional loss function, such as cross entropy and square error, the label value of the correct class may be set to be 0.6-0.8, the erroneous label is the equal division of the rest, and the sum of the correct label and the erroneous label is 1. For example, when the correct label is selected to be 0.6, the rest 0.4 is divided equally to the rest erroneous labels, for example, set to be [0.6,0.1,0.1, 0.1,0.1].

In an embodiment, the step of performing the error calculation to the data sample of the new target image, acquiring the gradient values of the parameters in the object-class model, selecting the some of parameters according to the magnitudes of the gradient values, and updating the some of parameters comprises:

selecting some of parameters whose gradient values are greater than a preset threshold or some of parameters whose gradient values are in a preset proportion range when the gradient values are descending-ordered from higher to lower, and updating the some of parameters in one or more of the following modes:

the first mode: updating some of parameters in a fully connected layer;

the second mode: updating some of parameters in a fully connected layer and a 1*1 convolutional layer; and the third mode: updating some of parameters in a fully connected layer and convolutional layers of all sizes.

Usually, a dataset is used to train all of the parameters of a model, or a fixed layer is selected, and all of the parameters of the layer are trained. Such a mode changes a large quantity of the parameters, and makes a large alternation of the model.

The scene that the present disclosure relates to is: a model has already be deployed on a production line, and because of an accident or a new condition, for example the generation of a new product defect, the present model cannot correctly classify and identify it. Therefore, the model should be able to process the new condition while maintaining the original model capacity. In other words, the model is required to maintain the original capacity, and is also required to be able to accommodate the new condition.

In this case, directly modifying all of the parameters of the model or modifying too much parameters tends to make the overall outputting of the model confusing, which results in that the model cannot maintain the original capacity. Therefore, it is required to select some of parameters to be modified, and it will be sufficient that the model can accommodate the new demand by the modification to the small extent.

The first mode: updating merely the fully connected layer.

The particular mode of selecting the parameters is: selecting the parameters that have the 5%-10% maximum gradient values in the back propagation for the parameter updating, and the selected layer is a fully connected layer.

In other words, merely the parameters that have the top 5%-10% of the gradient values, from higher to lower, are selected from the parameters of the fully connected layer for the updating. In other words, it is required to calculate the gradient values of the parameters of the fully connected layer, sort the gradient values, and select the maximum part for the updating.

It should be noted that the calculation of the gradient values in the back propagation generally follows the chain rule:

$$\frac{\partial u(n)}{\partial u(j)} = \sum_{path(u^{(\pi_1)}, u^{(\pi_2)}, \ldots, u^{(\pi_t)})} \prod_{k=2}^{t} \frac{\partial u^{(\pi_k)}}{\partial u^{(\pi_{k-1})}}$$

from $\pi_1 = j$ to $\pi_t = n$

In other words, if the derivative of the parameter u(n) with respect to the parameter u(j) is to be solved, because the u(n) and the u(j) have a hierarchical relation, it is required to individually solve the derivatives of the hierarchies according to the hierarchical path; in other words, it is required to solve the derivatives of u ($\pi_k$) with respect to u ($\pi_{k-1}$) by iteration. For example, y1 is obtained from x via the parameters w1 and b1, and then y2 is obtained from y1 via w2 and b2. If the derivative of y2 with respect to w1 is to be solved, the process may comprise solving the derivative of y2 with respect to y1 and then the derivative of y1 with respect to w1. The gradient values of the parameters are finally determined according to the result of the differentiation.

In addition, the above parameter selecting is made by referring to the properties of the convolutional neural network. In an image neural network, the neural network may generally be divided into two parts: a feature extracting part and a part for performing goal regression or classification according to the feature. The part preceding the fully connected layer is generally the feature extracting part, and the fully connected layer is the goal-regression part.

Usually, the features that are extracted based on the feature extraction of deep learning are sufficient to satisfy the demand of the classification task. Therefore, the particular demand can be satisfied by merely adjusting the goal-regression part (i.e., the fully connected layer).

In the present embodiment, in the quick training, preferably, the first mode is employed to adjust the parameters of the fully connected layer in the model, and in the verification stage a validation set comprising a new target image may be employed to train the model, thereby quickly obtaining an object-class model that can accommodate the new condition.

The second mode: updating the fully connected layer and the 1*1 convolutional layer.

If merely updating the parameters of the fully connected layer cannot enable the model to satisfy the demand of the new target image, it is required to update the 1*1 convolutional layer. Preferably, the particular mode of selecting the parameters is similar to that of the first mode, for example, selecting the parameters that have the 5%-10% maximum gradient values in the back propagation in the 1*1 convolutional layer for the parameter updating.

That is because the 1*1 convolutional layer is part of the feature extraction of the convolutional neural network, and besides the 1*1 convolutional layer, the feature extracting part also comprises a 3*3 convolution kernel, a 5*5 convolution kernel, an inception kernel and so on. Generally, the function of a 3*3 convolution kernel or a convolution kernel of a larger size is to extract from a picture the feature values, and the function of a 1*1 convolution kernel is to combine the feature values. The effect of modifying a 1*1 convolution kernel is to enhance certain features and suppress other features.

If the fully connected layer has a poor effect, that may probably be because the corresponding feature has not been extracted. Therefore, modifying the 1*1 convolutional layer to increase the intensities of certain features, facilitate to extract the corresponding features, and perform the corresponding goal regression.

The third mode: updating the fully connected layer, the 1*1 convolutional layer and all of the other convolutional layers.

Generally, the models that are trained by using the above two modes can satisfy the practical demands. If the obtained model still cannot satisfy the requirement on the classification accuracy, other 3*3, 5*5 or convolution kernels of a larger size may be trained as trial.

Regarding the convolution kernels, the process should comprise, by using the sum of the absolute values of the gradients of all of the parameters in a single convolution kernel as the reference, sorting the convolution kernels in the same layer, and selecting the convolution kernels that have the 5% maximum absolute values of the gradients in the back propagation for the parameter updating.

Certainly, according to the experience and the emergency of the newly generated image, if it is predicted that merely updating the parameters of the fully connected layer cannot satisfy the requirement, the fully connected layer and the 1*1 convolutional layer or the fully connected layer and the convolutional layers of all of the sizes may be directly trained and updated the parameters, thereby obtaining a good comprehensive benefit.

In a preferable embodiment, the step of selecting the some of parameters whose gradient values are in the preset proportion range when the gradient values are descending-ordered from higher to lower further comprises:

in back propagation, descending-ordering the gradient values of the parameters from higher to lower, selecting some of parameters corresponding to the gradient values in the range of 5%-10%, and updating the some of parameters; and providing a learning rate less than a preset threshold, to prevent over-fitting of the object-class model.

For example, the process may comprise selecting the some of parameters that correspond to the maximum 5%-10% of the gradient values of the parameters of the fully connected layer, and updating the some of parameters in the process of the model training. In addition, in the parameter updating, the learning rate may be set to be of the order of magnitude of $10^{-4}$, to prevent over-fitting in the training. Furthermore, if more parameters are used, the learning rate that is required to be used is smaller. Because the modification on the convolution kernels tends to result in the disappearance of the network instability gradient, preferably, the learning rate is of the order of magnitude of $10^{-5}$; for example, the learning rate may be set to be $5*10^{-5}$.

In an embodiment, the method further comprises: when a main classification of the object-class model firstly outputs a deterministic checkout result or when a time quantity of outputting a deterministic checkout result is greater than a predetermined time quantity, stopping the training of the object-class model using the new target image.

In the present embodiment, in order to increase the speed of the model training by using the new target image, when the output probability of the primary class of the object-class model is greater than 0.5, that is a deterministic checkout result. Alternatively, when the time quantity of the deterministic checkout results is greater than a predetermined time quantity, for example, when the time quantity of the checkout probability being greater than 0.5 is greater than 5 times, the targeted quick training may be stopped, thereby saving the time of the quick training. For example, the model aims to classify the inputted data into 5 classes, and the current inputted image is of the first class. When the output of the first class is greater than 0.5, the targeted training is considered as completed.

When the targeted training is completed, the updated model that can accommodate a special case (i.e., an object-class model that can correctly classify the new target image) is obtained in the present embodiment, to further improve the effect of the classification.

In an embodiment, the step of training to obtain an object-class model that is capable of correctly classifying the new target image further comprises: training the object-class model by using a full dataset comprising the new target image, and when an accuracy of classification of the object-class model that is obtained by the training does not reach a preset threshold, updating the some of parameters of the object-class model.

In the present embodiment, after the targeted training has been completed, it is further required to train by using a full dataset comprising the new target image, to ensure the effect of the model on the fitting of all of the classes. That is because the data of the full dataset encompass the primary class and other classes than the primary class. Generally, one round of the training of the full dataset is sufficient.

Furthermore, after the training of the model by using the full dataset has been completed, and when the accuracy of the classification of the object-class model that is obtained by the training does not reach a preset threshold, it is further required to update again the some of parameters of the object-class model, to obtain finally a qualified object-class model.

In an embodiment, the step of, according to the new target image, selecting the some of parameters, adjusting the some of parameters is: adjusting merely some of parameters of the fully connected layer. That is because adjusting merely the some of parameters of the fully connected layer is the quickest and most easily implementable mode.

At this point, if the accuracy of the classification of the object-class model does not reach the preset threshold, that indicates that adjusting merely some of parameters of the fully connected layer is insufficient. Therefore, the process may comprise updating some of parameters of the fully connected layer and the 1*1 convolutional layer, and after the updating has been completed, verifying the object-class model by using a validation set for whether it can satisfy the condition of stopping the training.

If the accuracy of the classification of the object-class model still does not reach the preset threshold, the process comprises updating some of parameters of the fully connected layer and convolutional layers of all sizes, till the accuracy condition is satisfied, and stopping updating the some of parameters.

Certainly, other modes may be selected. For example, in the step of, according to the new target image, selecting the some of parameters, adjusting the some of parameters, the step may comprise updating some of parameters of the fully connected layer, and simultaneously updating some of parameters of the fully connected layer and the 1*1 convolutional layer; and if the condition of the preset threshold cannot be satisfied, i.e., if the accuracy of the classification of the object-class model does not reach the preset threshold, updating some of parameters in a fully connected layer and in convolutional layers of all sizes, till the accuracy condition is satisfied, and stopping updating the some of parameters.

Figure 2:
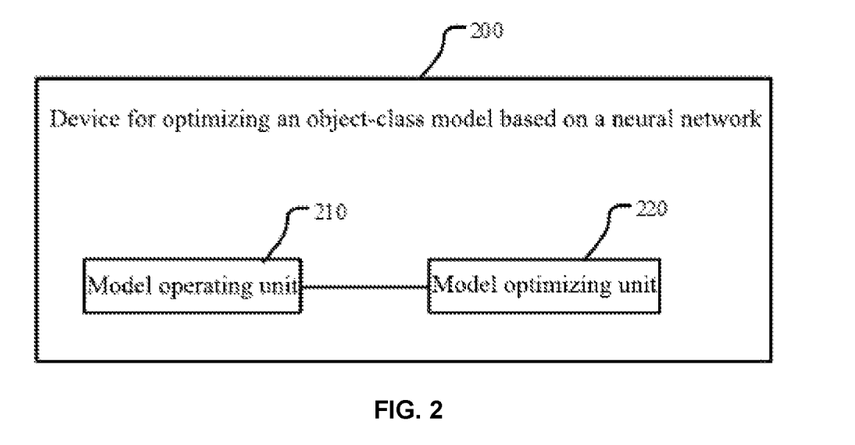
FIG. 2 shows a schematic structural diagram of the device for optimizing an object-class model based on a neural network according to an embodiment of the present disclosure.

FIG. 2 shows a schematic structural diagram 200 of the device for optimizing an object-class model based on a neural network according to an embodiment of the present disclosure. The device comprises:

a model operating unit 210, adapted for establishing the object-class model based on the neural network, training the object-class model, and realizing classification of target images by using the object-class model that has been trained.

The present embodiment of the present disclosure discloses a device for optimizing and adjusting an object-class model based on a neural network, which can be used to detect defective products and identify the classes of the defects of the products in a smart manufacturing production line, and may also be used for other object-class detections, for example the detection and class identification of objects such as cars.

The present disclosure mainly realizes the adjusting and optimization of present object-class models. Therefore, the operation state of the present model is described at the model operating unit 210, which comprises the cases of the establishing and training of the object-class model based on the neural network and the realizing of the classification of the target images.

A model optimizing unit 220, adapted for, when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

When a target image of a new condition is generated, according to the target image, some of parameters are selected. The some of parameters may be parameters of the model, and may also be parameters that are involved in the pre-processing of the image, and the some of parameters are selected according to the new target image, and can have a great influence on or show an obvious difference in the correct classification or identification of the new target image. By merely adjusting some of parameters the correct classification by the model to the new target image can be realized, and at the same time the other most of the parameters are not required to be changed.

In conclusion, the optimized solution according to the present embodiment can solve the problem that, when in a present production line a verified model is running and some new abnormal problems suddenly emerge, the present model cannot discriminate them. As the production line cannot stop operating, the optimized solution can enable the model to quickly iterate, and accurately discriminate the classes of the abnormal product defects, to satisfy the new demands of the production line. Furthermore, the solution can reserve most of the parameters of the present model, and enable the model to accommodate the data of the new target image by merely modifying a small quantity of the parameters.

In an embodiment, the model optimizing unit 220 comprises the following one or two modes:

One of the modes is: selecting a label value for classifying the new target image, and, according to a type of a loss function in the object-class model, adjusting the label value.

Another mode is: performing error calculation to a data sample of the new target image, acquiring gradient values of parameters in the object-class model, selecting some of parameters according to magnitudes of the gradient values, and updating some of parameters.

In an embodiment, the model optimizing unit 220 is adapted for:

if the loss function in the object-class model is a focal_loss function, setting a label value of a primary class to be a first value in a first numerical-value range and a label value of a secondary class to be 0; and if the loss function is a loss function other than the focal_loss function, setting a label value of a primary class to be a second value in a second numerical-value range, and a label value of a secondary class to be an average value of a difference between 1 and the second value divided by a quantity of labels of the secondary class;

wherein both of the first numerical-value range and the second numerical-value range are a subset of (0.5-1).

In an embodiment, the model optimizing unit 220 is further adapted for:

selecting a label value for classifying the new target image, and, according to a type of a loss function in the object-class model, adjusting the label value; and performing error calculation to a data sample of the new target image, acquiring gradient values of parameters in the object-class model, selecting the some of parameters according to magnitudes of the gradient values, and updating the some of parameters.

In an embodiment, the step of selecting the label value for classifying the new target image, and, according to the type of the loss function in the object-class model, adjusting the label value comprises: if the loss function in the object-class model is a focal_loss function, setting a label value of a primary class to be a first value in a first numerical-value range and a label value of a secondary class to be 0; and if the loss function is a loss function other than the focal_loss function, setting a label value of a primary class to be a second value in a second numerical-value range, and a label value of a secondary class to be an average value of a difference between 1 and the second value divided by a quantity of labels of the secondary class; wherein both of the first numerical-value range and the second numerical-value range are a subset of (0.5-1).

In an embodiment, the step of performing the error calculation to the data sample of the new target image, acquiring the gradient values of the parameters in the object-class model, selecting the some of parameters according to the magnitudes of the gradient values, and updating the some of parameters comprises: selecting some of parameters whose gradient values are greater than a preset threshold or some of parameters whose gradient values are in a preset proportion range when the gradient values are descending-ordered from higher to lower, and updating the some of parameters in one or more of the following modes: updating merely some of parameters in a fully connected layer; updating some of parameters in a fully connected layer and a 1*1 convolutional layer; and updating some of parameters in a fully connected layer and a full-size convolutional layer.

In a preferable embodiment, the step of selecting the some of parameters whose gradient values are in the preset proportion range when the gradient values are descending-ordered from higher to lower further comprises:

in back propagation, descending-ordering the gradient values of the parameters from higher to lower, selecting the some of parameters corresponding to the gradient values in the range of 5%-10%, and updating the some of parameters; and providing a learning rate less than a preset threshold, to prevent over-fitting of the object-class model.

In an embodiment, the device further comprises: a training-stopping judging unit, adapted for, when a main classification of the object-class model firstly outputs a deterministic checkout result or when a time quantity of outputting a deterministic checkout result is greater than a predetermined time quantity, stopping the training of the object-class model using the new target image.

In an embodiment, the model optimizing unit 220 is further adapted for training the object-class model by using a full dataset comprising the new target image, and when an accuracy of classification of the object-class model that is obtained by the training does not reach a preset threshold, updating the some of parameters of the object-class model.

In an embodiment, when the model optimizing unit 220 executes, according to the new target image, selecting some of parameters, adjusting the some of parameters, the model optimizing unit 220 is further adapted for:

updating merely some of parameters in a fully connected layer.

The updating the some of parameters of the object-class model by the model optimizing unit 220 particularly comprises:

if the accuracy of the classification of the object-class model does not reach the preset threshold, updating the some of parameters of the fully connected layer and the 1*1 convolutional layer, and then verifying the object-class model by using the validation set; and if the accuracy of the classification of the object-class model still does not reach the preset threshold, updating the some of parameters of the fully connected layer and the convolutional layers of all sizes, till the accuracy condition is satisfied, and stopping updating the some of parameters; or, when the model optimizing unit 220 executes, according to the new target image, selecting some of parameters, adjusting the some of parameters, the model optimizing unit 220 is further adapted for:

updating some of parameters in a fully connected layer; and updating some of parameters in a fully connected layer and a 1*1 convolutional layer;

the updating the some of parameters of the object-class model by the model optimizing unit 220 particularly comprises:

if the accuracy of the classification of the object-class model does not reach the preset threshold, updating the some of parameters in a fully connected layer and convolutional layers of all sizes, till the accuracy condition is satisfied, and stopping updating the some of parameters.

The particular functions of the units and modules in the device embodiments may refer to the relevant contents of the process embodiments of the present disclosure, and are not discussed here further.

In conclusion, the solution of optimizing the object-class model based on a neural network according to the present disclosure can enable the object-class model to accommodate new scenes while ensuring the performance of the object-class model, and the training speed is greatly increased, whereby the model training can be completed within approximately 20 minutes.

It should be noted that:

The algorithms and displays provided herein are not inherently relevant to any specific computer, virtual device or other devices. Various general-purpose devices may also be used together with the teaching herein. According to the above description, the structures that are required to construct this type of devices are apparent. Furthermore, the present disclosure is not limited to any specific programming language. It should be understood that the contents of the present disclosure described herein can be implemented by using various programming languages, and the description above for a specific language is intended to disclose the most preferable embodiments of the present disclosure.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

Furthermore, a person skilled in the art can understand that, although some embodiments described herein comprise a certain features that are included in other embodiments instead of other features, the combination of the features of different embodiments means maintaining within the scope of the present disclosure and forming different embodiments. For example, in the following claims, any one of the embodiments that the present disclosure seeks to protect can be used in any combination.

Each component embodiment of the present disclosure may be implemented by hardware, or by software modules that are operated on one or more processors, or by a combination thereof. A person skilled in the art should understand that some or all of the functions of some or all of the components of the device for optimizing an object-class model based on a neural network according to the embodiments of the present disclosure may be implemented by using a microprocessor or a digital signal processor (DSP) in practice. The present disclosure may also be implemented as apparatus or device programs (for example, computer programs and computer program products) for executing part of or the whole of the method described herein. Such programs for implementing the present disclosure may be stored in a computer readable medium, or may be in the form of one or more signals. Such signals may be downloaded from Internet websites, or provided on a carrier signal, or provided in any other forms.

Figure 3:
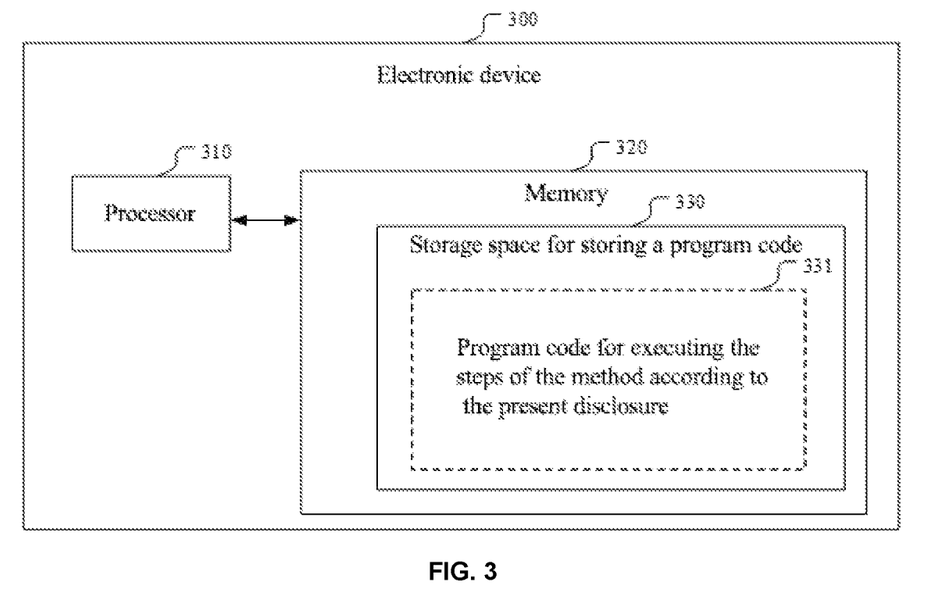
FIG. 3 shows a schematic structural diagram of the electronic device according to an embodiment of the present disclosure.

For example, FIG. 3 shows a schematic structural diagram of the electronic device according to an embodiment of the present disclosure. The electronic device 300 comprises a processor 310 and a memory 320 adapted for storing a computer program (computer readable program code).

Particularly, when the computer program is executed, the computer program causes the processor 310 to execute the following method:

establishing the object-class model based on the neural network, training the object-class model, and realizing classification of target images by using the object-class model that has been trained; and when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

Particularly, when the computer program is executed, the computer program causes the processor 310 to execute the following method:

selecting a label value for classifying the new target image, and, according to a type of a loss function in the object-class model, adjusting the label value; and performing error calculation to a data sample of the new target image, acquiring gradient values of parameters in the object-class model, selecting the some of parameters according to magnitudes of the gradient values, and updating the some of parameters.

Particularly, when the computer program is executed, the computer program causes the processor 310 to execute the following method:

selecting some of parameters whose gradient values are greater than a preset threshold or some of parameters whose gradient values are in a preset proportion range when the gradient values are descending-ordered from higher to lower, and updating the some of parameters in one or more of the following modes:

updating the some of parameters in a fully connected layer;

updating the some of parameters in a fully connected layer and a 1*1 convolutional layer; and updating the some of parameters in a fully connected layer and convolutional layers of all sizes.

Particularly, when the computer program is executed, the computer program causes the processor 310 to execute the following method:

when a main classification of the object-class model firstly outputs a deterministic checkout result or when a time quantity of outputting a deterministic checkout result is greater than a predetermined time quantity, stopping the training of the object-class model using the new target image.

Particularly, when the computer program is executed, the computer program causes the processor 310 to execute the following method:

training the object-class model by using a full dataset comprising the new target image, and when an accuracy of classification of the object-class model that is obtained by the training does not reach a preset threshold, updating the some of parameters of the object-class model.

Particularly, when the computer program is executed, the computer program causes the processor 310 to execute the following method:

updating merely the some of parameters in a fully connected layer;

correspondingly, if the accuracy of the classification of the object-class model does not reach the preset threshold, updating the some of parameters of the fully connected layer and the 1*1 convolutional layer, and then verifying the object-class model by using the validation set; if the accuracy of the classification of the object-class model still does not reach the preset threshold, updating some of parameters of the fully connected layer and the convolutional layers of all sizes, till the accuracy condition is satisfied, and stopping updating the some of parameters;

or, when the computer program is executed, the computer program further causes the processor 310 to execute the following method:

updating the some of parameters in a fully connected layer; and updating the some of parameters in a fully connected layer and a 1*1 convolutional layer; and correspondingly, if the accuracy of the classification of the object-class model does not reach the preset threshold, updating some of parameters in a fully connected layer and convolutional layers of all sizes, till the accuracy condition is satisfied, and stopping updating the some of parameters.

Figure 4:
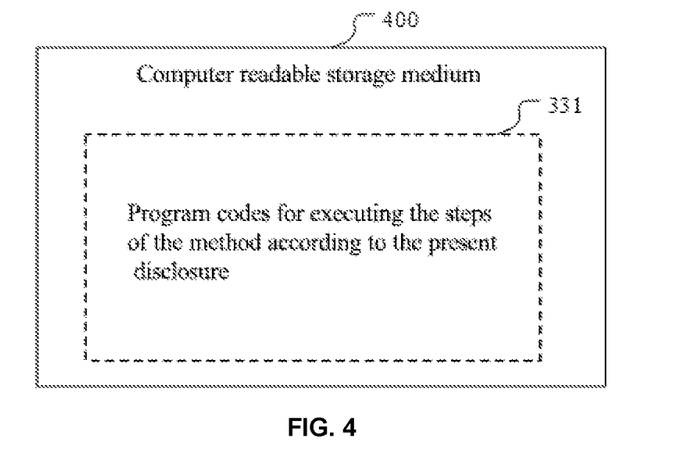
FIG. 4 shows a schematic structural diagram of the computer readable storage medium according to an embodiment of the present disclosure.

The memory 320 may be electronic memories such as flash memory, EEPROM (Electrically Erasable Programmable Read Only Memory), EPROM, hard disk or ROM. The memory 320 has the storage space 330 of the computer readable program code 331 for executing any steps of the above method. For example, the storage space 330 for computer readable program code may include computer readable program codes 331 for individually implementing each of the steps of the above method. Those computer readable program codes 331 may be read from one or more computer program products or be written into the one or more computer program products. Those computer program products comprise program code carriers such as hard disk, compact disk (CD), memory card or floppy disk. Such computer program products are usually for example the computer readable storage medium as shown in FIG. 4. FIG. 4 shows a schematic structural diagram of the computer readable storage medium according to an embodiment of the present disclosure. The computer readable storage medium 400 stores the computer readable program code 331 for executing the steps of the method according to the present disclosure, which can be read by the processor 310 of the electronic device 300. When the computer readable program code 331 is operated by the electronic device 300, the computer readable program code 331 causes the electronic device 300 to execute the steps of the methods described above. Particularly, the computer readable program code 331 stored in the computer readable storage medium can execute the method illustrated by any one of the above-described embodiments. The computer readable program code 331 may be compressed in a suitable form.

It should be noted that the above embodiments are for describing the present disclosure rather than limiting the present disclosure, and a person skilled in the art may design alternative embodiments without departing from the scope of the appended claims. In the claims, any reference signs between parentheses cannot bring about limitation to the claims. The word "comprise" does not exclude the elements or steps that are not listed in the claims. The word "a" or "an" preceding an element does not exclude the existing of a plurality of such elements. The present disclosure may be implemented by means of hardware comprising several distinct elements and by means of suitably programmed computers. In unit claims that list several devices, some of those devices may be embodied by the same item of hardware. The words first, second, and third, etc. do not denote any order. These words can be interpreted as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for optimizing an object-class model based on a neural network, wherein the method comprises:
    establishing the object-class model based on the neural network, training the object-class model, and realizing classification of target images by using the object-class model that has been trained; and
    when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

2. The method according to claim 1, wherein the step of, according to the new target image, selecting some of parameters, adjusting the some of parameters, and training to obtain an object-class model that is capable of correctly classifying the new target image comprises one or two of the following:
    selecting a label value for classifying the new target image, and, according to a type of a loss function in the object-class model, adjusting the label value; and
    performing error calculation to a data sample of the new target image, acquiring gradient values of parameters in the object-class model, selecting the some of parameters according to magnitudes of the gradient values, and updating the some of parameters.

3. The method according to claim 2, wherein the step of selecting a label value for classifying the new target image, and, according to a type of a loss function in the object-class model, adjusting the label value comprises:
    if the loss function in the object-class model is a focal_loss function, setting a label value of a primary class to be a first value in a first numerical-value range and a label value of a secondary class to be 0; and
    if the loss function is a loss function other than the focal_loss function, setting a label value of a primary class to be a second value in a second numerical-value range, and a label value of a secondary class to be an average value of a difference between 1 and the second value divided by a quantity of labels of the secondary class;
    wherein both of the first numerical-value range and the second numerical-value range are a subset of (0.5-1).

4. The method according to claim 2, wherein the step of performing error calculation to a data sample of the new target image, acquiring gradient values of the parameters in the object-class model, selecting the some of parameters according to magnitudes of the gradient values, and updating the some of parameters comprises:
    selecting some of parameters whose gradient values are greater than a preset threshold or some of parameters whose gradient values are in a preset proportion range when the gradient values are descending-ordered from higher to lower, and updating the some of parameters in one or more of the following modes:
    updating some of parameters in a fully connected layer;
    updating some of parameters in a fully connected layer and a 1*1 convolutional layer; and
    updating some of parameters in a fully connected layer and convolutional layers of all sizes.

5. The method according to claim 4, wherein the step of selecting some of parameters whose gradient values are in a preset proportion range when the gradient values are descending-ordered from higher to lower further comprises:
    in back propagation, descending-ordering the gradient values of the parameters from higher to lower, selecting some of parameters corresponding to the gradient values in the range of 5%-10%, and updating the some of parameters; and
    providing a learning rate less than a preset threshold, to prevent over-fitting of the object-class model.

6. The method according to claim 1, wherein the method further comprises:
    when a main classification of the object-class model firstly outputs a deterministic checkout result or when a time quantity of outputting a deterministic checkout result is greater than a predetermined time quantity, stopping the training of the object-class model using the new target image.

7. The method according to claim 6, wherein the step of training to obtain the object-class model that is capable of correctly classifying the new target image further comprises:
    training the object-class model by using a full dataset comprising the new target image, and when an accuracy of classification of the object-class model that is obtained by the training does not reach a preset threshold, updating the some of parameters of the object-class model.

8. The method according to claim 7, wherein
if the step of, according to the new target image, selecting some of parameters, adjusting the some of parameters is:
updating merely some of parameters in a fully connected layer;
then the step of updating the some of parameters of the object-class model comprises:
if the accuracy of the classification of the object-class model does not reach the preset threshold, updating some of parameters of the fully connected layer and the 1*1 convolutional layer, and then verifying the object-class model by using a validation set; and
if the accuracy of the classification of the object-class model still does not reach the preset threshold, updating some of parameters of the fully connected layer and the convolutional layers of all sizes, till the accuracy condition is satisfied, and stopping updating the some of parameters.

9. The method according to claim 7, wherein
if the step of, according to the new target image, selecting some of parameters, adjusting the some of parameters is:
updating some of parameters in a fully connected layer; and
updating some of parameters in a fully connected layer and a 1*1 convolutional layer;
then the step of updating the some of parameters of the object-class model comprises:
if the accuracy of the classification of the object-class model does not reach the preset threshold, updating some of parameters in a fully connected layer and convolutional layers of all sizes, till the accuracy condition is satisfied, and stopping updating the some of parameters.

10. The method according to claim 3, wherein both of the first numerical-value range and the second numerical-value range are 0.6 to 0.8.

11. A device for optimizing an object-class model based on a neural network, wherein the device comprises:
a model operating unit, adapted for establishing the object-class model based on the neural network, training the object-class model, and realizing classification of target images by using the object-class model that has been trained; and
a model optimizing unit, adapted for, when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

12. The device according to claim 11, wherein the model optimizing unit is further adapted for training the object-class model by using a full dataset comprising the new target image, and when an accuracy of classification of the object-class model that is obtained by the training does not reach a preset threshold, updating the some of parameters of the object-class model.

13. The device according to claim 12, wherein the model optimizing unit is further adapted for updating merely some of parameters in a fully connected layer;
correspondingly, if the accuracy of the classification of the object-class model does not reach the preset threshold, updating the some of parameters of the fully connected layer and the 1*1 convolutional layer, and then verifying the object-class model by using a validation set; and
if the accuracy of the classification of the object-class model still does not reach the preset threshold, updating some of parameters of the fully connected layer and the convolutional layers of all sizes, till the accuracy condition is satisfied, and stopping updating the some of parameters; or,
the model optimizing unit is further adapted for
updating some of parameters in a fully connected layer; and
updating some of parameters in a fully connected layer and a 1*1 convolutional layer; and
correspondingly,
if the accuracy of the classification of the object-class model does not reach the preset threshold, updating some of parameters in a fully connected layer and convolutional layers of all sizes, till the accuracy condition is satisfied, and stopping updating the some of parameters.

14. An electronic device, comprising: a processor; and a memory adapted for storing a computer program, wherein when the computer program is executed, the computer program causes the processor to execute the following method:
establishing the object-class model based on the neural network, training the object-class model, and realizing classification of target images by using the object-class model that has been trained; and
when a new target image is generated, and the new target image is an image corresponding to a new condition of a target and is capable of still being classified into an original classification system, judging a result of identification of the object-class model to the new target image, and if the object-class model is not capable of correctly classifying the new target image, according to the new target image, selecting some of parameters, adjusting the some of parameters, and training to obtain an object-class model that is capable of correctly classifying the new target image.

15. The electronic device according to claim 14, wherein when the computer program is executed, the computer program further causes the processor to execute the following method:
selecting a label value for classifying the new target image, and, according to a type of a loss function in the object-class model, adjusting the label value; and
performing error calculation to a data sample of the new target image, acquiring gradient values of parameters in the object-class model, selecting the some of parameters according to magnitudes of the gradient values, and updating the some of parameters.

16. The electronic device according to claim 14, wherein when the computer program is executed, the computer program further causes the processor to execute the following method:
selecting some of parameters whose gradient values are greater than a preset threshold or some of parameters whose gradient values are in a preset proportion range when the gradient values are descending-ordered from higher to lower, and updating the some of parameters in one or more of the following modes:

updating some of parameters in a fully connected layer;

updating some of parameters in a fully connected layer and a 1*1 convolutional layer; and updating some of parameters in a fully connected layer and convolutional layers of all sizes.

17. The electronic device according to claim 14, wherein when the computer program is executed, the computer program further causes the processor to execute the following method:

when a main classification of the object-class model firstly outputs a deterministic checkout result or when a time quantity of outputting a deterministic checkout result is greater than a predetermined time quantity, stopping the training of the object-class model using the new target image.

18. The electronic device according to claim 14, wherein when the computer program is executed, the computer program further causes the processor to execute the following method:

training the object-class model by using a full dataset comprising the new target image, and when an accuracy of classification of the object-class model that is obtained by the training does not reach a preset threshold, updating the some of parameters of the object-class model.

19. The electronic device according to claim 18, wherein when the computer program is executed, the computer program further causes the processor to execute the following method:

updating merely some of parameters in a fully connected layer;

correspondingly, if the accuracy of the classification of the object-class model does not reach the preset threshold, updating some of parameters of the fully connected layer and the 1*1 convolutional layer, and then verifying the object-class model by using a validation set; if the accuracy of the classification of the object-class model still does not reach the preset threshold, updating some of parameters of the fully connected layer and the convolutional layers of all sizes, till the accuracy condition is satisfied, and stopping updating the some of parameters;

or, when the computer program is executed, the computer program further causes the processor to execute the following method:

updating some of parameters in a fully connected layer; and updating some of parameters in a fully connected layer and a 1*1 convolutional layer; and correspondingly, if the accuracy of the classification of the object-class model does not reach the preset threshold, updating some of parameters in a fully connected layer and convolutional layers of all sizes, till the accuracy condition is satisfied, and stopping updating the some of parameters.

* * * * *